US012092429B2

(12) United States Patent
Morinishi et al.

(10) Patent No.: US 12,092,429 B2
(45) Date of Patent: Sep. 17, 2024

(54) PROBABILISTIC LOW-POWER POSITION AND ORIENTATION

(71) Applicant: Cubic Corporation, San Diego, CA (US)

(72) Inventors: Justin Morinishi, San Diego, CA (US); Karl Post, Garden Grove, CA (US); Sunita Shah, San Diego, CA (US); Yeunbin Tsai, San Diego, CA (US); David Simmons, Orlando, FL (US)

(73) Assignee: Cubic Corporation, San Diego, CA (US)

( * ) Notice: Subject to any disclaimer, the term of this patent is extended or adjusted under 35 U.S.C. 154(b) by 436 days.

(21) Appl. No.: 16/994,152

(22) Filed: Aug. 14, 2020

(65) Prior Publication Data

US 2021/0048276 A1 Feb. 18, 2021

Related U.S. Application Data

(60) Provisional application No. 62/886,863, filed on Aug. 14, 2019.

(51) Int. Cl.
*F41G 3/26* (2006.01)
*F41A 33/00* (2006.01)
*G09B 9/00* (2006.01)

(52) U.S. Cl.
CPC .............. *F41G 3/26* (2013.01); *F41A 33/00* (2013.01); *G09B 9/003* (2013.01)

(58) Field of Classification Search
CPC .. F41G 3/26; F41A 33/00; F41A 33/02; F41A 33/04; F41A 33/06; G09B 9/003
See application file for complete search history.

(56) References Cited

U.S. PATENT DOCUMENTS 9,605,926 B1 3/2017 Means et al.
2007/0190494 A1* 8/2007 Rosenberg ............ A63F 13/803
463/40
2007/0287134 A1* 12/2007 Chung ................... G09B 19/00
434/22

(Continued)

OTHER PUBLICATIONS

International Search Report and Written Opinion mailed Mar. 29, 2021 in related application No. PCT/US2020/046465, all pgs.

(Continued)

*Primary Examiner* — Timothy A Musselman
(74) *Attorney, Agent, or Firm* — MUGHAL GAUDRY & FRANKLIN PC

(57) ABSTRACT

A base station server of a combat simulation system includes, a communications interface, a processor and a memory. The memory has instructions stored thereon that, when executed by the processor, cause the processor to receive an indication of a trigger pull from a weapon device and receive a data packet from the weapon device. The data packet may include an orientation of the weapon device and a position of the weapon device. The instructions further cause the processor to determine a position and an orientation of a target and identify a ballistic path of a simulated projectile fired from the weapon device. The ballistic path may be based at least in part on the orientation and the position of the weapon device. The instructions further cause the processor to determine a ballistic outcome by identifying whether the ballistic path intersects with the position of the target.

20 Claims, 6 Drawing Sheets

(56) References Cited

U.S. PATENT DOCUMENTS

| | | |
|---|---|---|
| 2010/0221685 A1 | 9/2010 | Carter |
| 2017/0097209 A1* | 4/2017 | Portoghese ............... F41G 3/26 |
| 2017/0316711 A1* | 11/2017 | Surdu .................... F41A 33/00 |
| 2019/0213901 A1 | 7/2019 | Kur et al. |

OTHER PUBLICATIONS

International Preliminary Report on Patentability mailed on Feb. 24, 2022 in International Patent Application No. PCT/US2020/046465, 7 pages.

* cited by examiner

PROBABILISTIC LOW-POWER POSITION AND ORIENTATION

CROSS-REFERENCES TO RELATED APPLICATIONS

This application claims the benefit of priority to U.S. Provisional Patent Application No. 62/886,863, filed Aug. 14, 2019, entitled "PROBABILISTIC LOW-POWER POSITION AND ORIENTATION," the entire content of which is incorporated herein by reference for all purposes.

STATEMENT REGARDING FEDERALLY SPONSORED RESEARCH AND DEVELOPMENT

This invention was made with government support awarded by the Defense Energy Center of Excellence, d/b/a National Security Technology Accelerator as outlined in NSTXL OTA Contract #: W900KK-18-9-0005/TO W900KK-19-9-0023; NSTXL Project Agreement #NSTXL-TREX-16-0023. The government has certain rights in the invention.

BACKGROUND OF THE INVENTION

Training exercises for military or other combat may often utilize weapons that use simulated ammunition. Conventional system utilize a laser-based architecture. However, laser-based systems fail to accurately simulate live rounds, as lasers do not mimic real-life ballistic effects, such as bullet drop, wind effects, canting effects, etc. Additionally, lasers may fail to penetrate fog or even thin objects such as paper or bushes that may provide visual cover but would not offer protection against a live round. Moreover, due to the generally linear/conical paths of lasers, lasers are not suitable for simulating artillery weapons. Thus, there is a need for more realistic weapons/combat training simulations.

BRIEF SUMMARY OF THE INVENTION

Embodiments of the present disclosure are directed to laserless training architectures that utilize back end ballistic calculations to realistically simulate ballistic paths and outcomes. Embodiments leverage high precision position an orientation sensors that may be calibrated to perform very precise aimpoint determinations. These aimpoint determinations, along with information about the ballistic characteristics of a given weapon and ammunition may be used to calculate the ballistic paths and outcomes, oftentimes factoring in outside factors such as wind, temperature, precipitation, etc.

In one particular embodiment, a base station server of a combat simulation system is provided. The server may include a communications interface, at least one processor, and a memory. The memory may have instructions stored thereon that, when executed by the at least one processor, cause the at least one processor to receive an indication of a trigger pull from a weapon device and receive a data packet from the weapon device. The data packet may include an orientation of the weapon device and a position of the weapon device. The instructions may also cause the at least one processor to determine a position and an orientation of a target and identify a ballistic path of a simulated projectile fired from the weapon device. The ballistic path may be based at least in part on the orientation and the position of the weapon device. The instructions may further cause the at least one processor to determine a ballistic outcome by identifying whether the ballistic path intersects with the position of the target.

In some embodiments, the data packet may also include an estimated uncertainty of one or both of the position of the weapon device and the orientation of the weapon device. Identifying the ballistic path may be further based at least in part on the estimated uncertainty. The indication of the trigger pull may also include a timestamp of the trigger pull. The instructions may further cause the at least one processor to determine a velocity and heading of one or both of the weapon device and the target. Determining the ballistic outcome may be further based on the velocity and heading of one or both of the weapon device and the target. In some embodiments, determining the position and the orientation of the target may include generating a number of positions indicative of a movement path of the target based on the velocity and heading of the target. Determining the ballistic outcome by identifying whether the ballistic path intersects with the position of the target may further include comparing the ballistic path with at least one of the number of positions based on the timestamp of the trigger pull, a distance between the weapon device and the target, and a velocity map of the simulated projectile. The ballistic path may be further based on one or more of ballistic properties associated with the weapon device and the simulated projectile, environmental conditions, a canting angle of the weapon device, and gravitational effects on the simulated projectile. The instructions may further cause the at least one processor to provide feedback related to the ballistic outcome to one or both of a user of the weapon device and the target. The instructions may also cause the at least one processor to calibrate one or both of the orientation and the position of the weapon device by comparing known locations of one or more objects relative to the orientation and the position of the weapon device.

In another embodiment, a method of determining a ballistic outcome of a simulated round at a base station server is provided. The method may include receiving an indication of a trigger pull from a weapon device and receiving a data packet from the weapon device. The data packet may include an orientation of the weapon device and a position of the weapon device. The method may also include determining a position and an orientation of a target and identifying a ballistic path of a simulated projectile fired from the weapon device. The ballistic path may be based at least in part on the orientation and the position of the weapon device. The method may further include determining a ballistic outcome by identifying whether the ballistic path intersects with the position of the target.

In some embodiments, the indication of the trigger pull and the data packet may be received as part of a single message from the weapon device. The data packet may further include an estimated uncertainty of one or both of the position of the weapon device and the orientation of the weapon device. Identifying the ballistic path may be further based at least in part on the estimated uncertainty. The indication of the trigger pull may further include a timestamp of the trigger pull. The method may also include determining a velocity and heading of one or both of the weapon device and the target. Determining the ballistic outcome may be further based on the velocity and heading of one or both of the weapon device and the target. In some embodiments, determining the position and the orientation of the target may include generating a number of positions indicative of a movement path of the target based on the velocity and heading of the target. Determining the ballistic outcome by identifying whether the ballistic path intersects with the position of the target may further include comparing the ballistic path with at least one of the number of positions based on the timestamp of the trigger pull, a distance between the weapon device and the target, and a velocity map of the simulated projectile. The ballistic path may be further based on one or more of ballistic properties associated with the weapon device and the simulated projectile, environmental conditions, a canting angle of the weapon device, and gravitational effects on the simulated projectile. The method may include providing feedback related to the ballistic outcome to one or both of a user of the weapon device and the target.

In another embodiment, a non-transitory computer-readable medium is provided. The computer-readable medium may have instructions stored thereon that, when executed by at least one processor, cause the at least one processor to receive an indication of a trigger pull from a weapon device and receive a data packet from the weapon device. The data packet may include an orientation of the weapon device and a position of the weapon device. The instructions may further cause the at least one processor to determine a position and an orientation of a target and identify a ballistic path of a simulated projectile fired from the weapon device. The ballistic path may be based at least in part on the orientation and the position of the weapon device. The instructions may also cause the at least one processor to determine a ballistic outcome by identifying whether the ballistic path intersects with the position of the target.

In some embodiments, the data packet may further include an estimated uncertainty of one or both of the position of the weapon device and the orientation of the weapon device. Identifying the ballistic path may be further based at least in part on the estimated uncertainty. The indication of the trigger pull may further include a timestamp of the trigger pull. The instructions may further cause the at least one processor to determine a velocity and heading of one or both of the weapon device and the target. Determining the ballistic outcome may be further based on the velocity and heading of one or both of the weapon device and the target. In some embodiments, determining the position and the orientation of the target may include generating a number of positions indicative of a movement path of the target based on the velocity and heading of the target. Determining the ballistic outcome by identifying whether the ballistic path intersects with the position of the target may further include comparing the ballistic path with at least one of the number of positions based on the timestamp of the trigger pull, a distance between the weapon device and the target, and a velocity map of the simulated projectile. The instructions may further cause the at least one processor to provide feedback related to the ballistic outcome to one or both of a user of the weapon device and the target. The instructions may further cause the at least one processor to calibrate one or both of the orientation and the position of the weapon device by comparing known locations of one or more objects relative to the orientation and the position of the weapon device.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a set of parentheses containing a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments of the present invention are directed to a probabilistic geopairing architecture that uses human position and orientation data plus estimated uncertainty data (which can be provided by the GPS and orientation sensors) to dynamically update virtual elements of a combat simulation system. Embodiments increase the robustness of geopairing systems in the presence of system uncertainties, such as orientation or position offsets. Embodiments may utilize mass market commercial off the shelf technology and innovative sensor fusion techniques, thereby future-proofing the simulation system technologies and allowing the combat simulation systems to leverage technological advancements in the commercial markets.

Embodiments may be used to determine a weapon's orientation in a simulated and operational environments. The systems and methods described herein may take the weapon's orientation and generate accurate ballistic outcomes for simulated weapon shots. For example, the systems and methods described herein may be utilized in a laserless weapons training architecture, an example of which can be found in U.S. Pat. App. No. 62/886,814 entitled "Universal Laserless Training Architecture," which is hereby incorporated by reference in its entirety for all purposes. Some embodiments achieve the orientation and ballistic outcome techniques using a combination of a low power orientation module that determines the weapon's orientation and position to a high degree of accuracy and a software module that intelligently fuses information from the orientation module and other sources of truth to provide accurate insights into time, space, position, and orientation information that can be combined with ballistic algorithms to generate ballistic outcomes.

Figure 1:
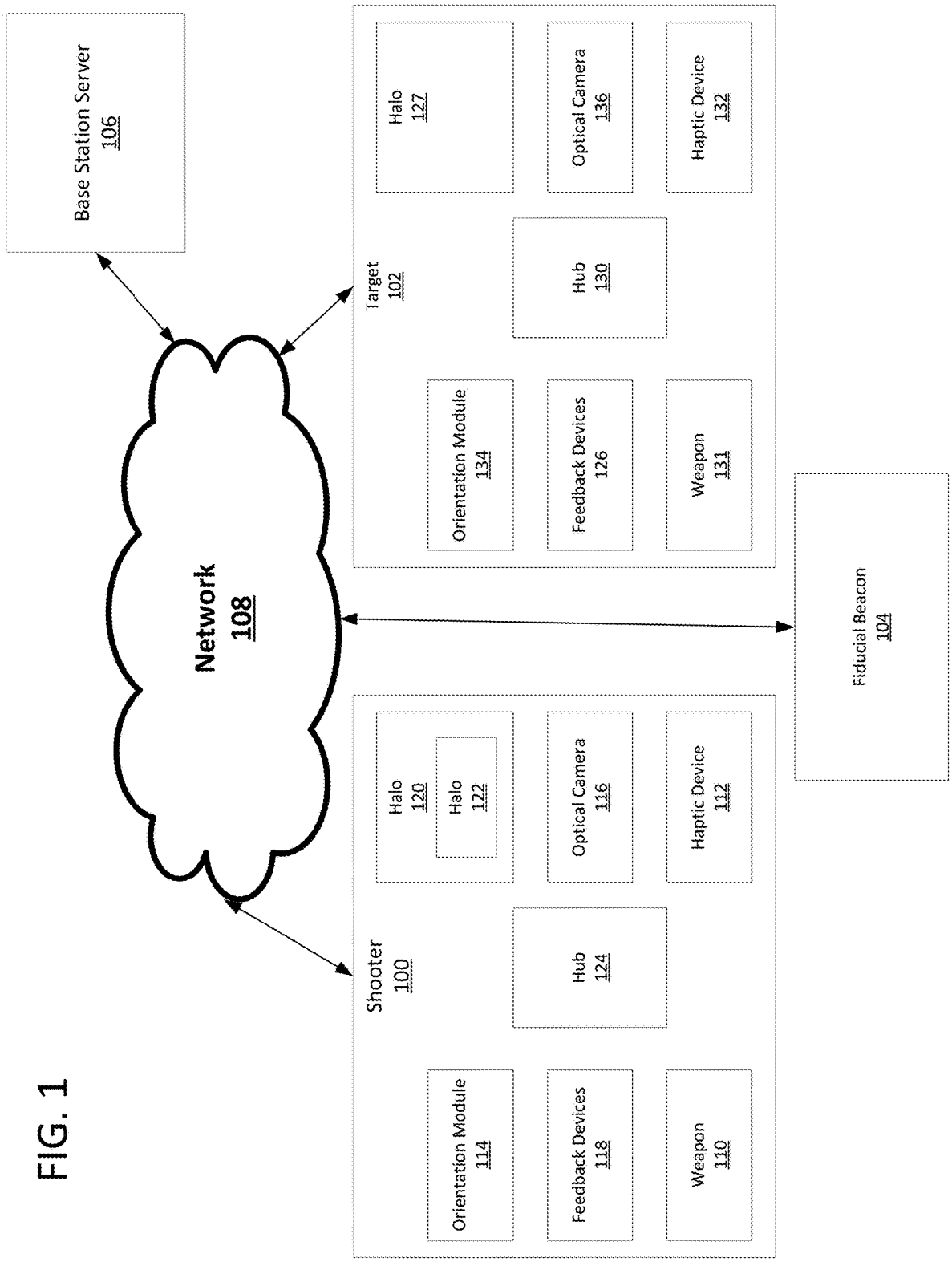
FIG. 1 is a system diagram of a laserless combat training system according to embodiments.

Turning now to FIG. 1, one embodiment of a system for determining ballistic outcomes according to the present disclosure. The system may include one or more human shooters 100 and one or more human targets 102. It will be appreciated that in many embodiments, some or all individuals within a training exercise may be both a shooter 100 and a target 102 and may carry similar. However, for the purposes of explanation, the present disclosure will treat the shooters 100 and targets 102 as distinct individuals with different roles. The system may further includes one or more fiducial beacons 104, which may be used for weapon calibration purposes. For example, the fiducial beacons 104 may be positioned about a training environment and have known, fixed locations. In some embodiments, each fiducial beacon 104 may include an optical emitter that transmits (continuously, periodic, on command, etc.) a signal identifying the ID and/or position of the fiducial beacon 104. Such information may be useable by components within the system to accurately determine a position of one or more entities/devices based on a relative position of the entity/device in relation to known positions of the identified fiducial beacons 104. The system may also include one or more base station servers 106, which may perform some or all calculations to determine simulated ballistic outcomes as discussed in greater detail below. The shooters 100, targets 102, truth sources 104, and/or base station servers 106 may communicate with one another using one or more networks 108. For example, each network 108 may include one or more cellular data network, such as 3G, 4G LTE, 5G, and/or future cellular networks, WLAN, WiMAX, and/or other wireless network technologies.

Each shooter 100 may include a weapon 110 that fires a simulated projectile. Oftentimes, the weapon 110 may be in the form of a gun (rifle, hand gun, automated weapon, etc.), however the weapon 110 may be the form of any weapon that fires a projectile. For example, in some embodiments, the weapon 110 may be in the form of a mortar, rocket propelled grenade (RPG), rocket launcher, and/or other artillery weapon device. In some embodiments, the weapon 110 may include a haptic device 112 that provides tactile feedback when a trigger of the weapon 110 is actuated that simulates the feel of the weapon 110 firing a live round. In some embodiments, the weapon 110 may fire blank cartridges, which may further provide haptic feedback, as well as provide realistic muzzle flash.

The shooter 100 may also include an orientation module 114. Orientation module 114 may be mounted on the weapon 110 and may include a position device and an orientation device. For example, the position device may include a precision GPS antenna and chip (such as GPS, GNSS, GPS-RTK, etc.) that is able to determine the position of the weapon 110 to within centimeters. The orientation device may include an inertial measurement unit (IMU) that enables the orientation module 114 to determine an orientation of the weapon 110, including azimuth, elevation, and canting angles. In some embodiments, the orientation module 114 may be affixed to a barrel of the weapon 110, however other mounting locations are possible.

Each shooter 100 may also include an optical camera 116 (such as UV, IR, visible light, etc.) that may be used for targeting purposes and to calibrate the orientation module 114 as will be discussed in greater detail below. The optical camera 116 may be mounted on the weapon 110 in alignment with a barrel of the weapon 110. Each shooter 100 may also include one or more feedback devices 118, such as a head mounted display, smartwatch, and/or other wearable that provides feedback regarding simulated shots fired from the weapon 110. For example, in the event of a head mounted display, the feedback may include a graphical fly out of a simulated round (such as a RPG shell), which may be driven by a hyper realistic physics engine. Additionally, audio feedback of the firing and/or hit of the simulated round may be provided via one or more speakers of the feedback device 118. Each shooter 100 may also wear a halo 120, vest, and/or other equipment that may include one or more optical beacons 122 that may be used for calibration and/or targeting purposes. The halo 120 may further include a position and/or orientation determination device, such as a GPS unit and/or IMU that may provide position and/or pose information about the shooter 100.

Each shooter 100 may include a hub 124 that may be carried or worn by the shooter 100. The hub 124 may communicate directly with the various components of the shooter 100, oftentimes over a wireless personal area network (WPAN), such as Bluetooth Low Energy (LE), which enables the communication of the equipment on the shooter 100 (optical beacon 122, halo 120, feedback devices 118), and on the weapon 110 (orientation module 114, haptic device 112, optical camera, etc.). The hub 124 may also include a radio that facilitates communication between the shooter 100 and with central base station server(s) 106 via a 4G LTE or other wireless network (such as LTE/5G point to point and or a mesh network) and may be provided by existing towers. The hub 124 may be any device, such as a special-purpose computing device, a mobile phone, a table computer, etc.

Each target 102 may include similar equipment. For example, each target 102 may include one or more feedback devices 126, such as a head mounted display, smartwatch, and/or other wearable that provides feedback regarding simulated shots fired from the weapon 110, such as information detailing whether the target 102 was hit, injured, killed, etc. For example, in the event of a head mounted display, the feedback may include audio feedback related to a hit to the target 102, possibly including audible feedback that indicates whether the target 102 was injured or killed by a particular hit. Other information may be provided to the target 102 to meet the needs of the particular training scenario. Additionally, haptic feedback of the firing and/or hit of the target 102 may be provided via one or more haptic devices (such as vibration mechanism) of the feedback device 118. Each shooter 102 may also wear a halo 127, vest, and/or other equipment that may include one or more optical beacons 128 (such as UV, IR, visible light, etc.) that may be used for calibration and/or targeting purposes. Each target 102 may include a hub 130 that may be carried or worn by the target 102. The hub 130 may be similar to the hub 124 worn by the shooters 100 and may communicate directly with the various components of the target 100 and may also include a radio that facilitates communication between the target 102 and with central base station server(s) 106.

As discussed above, oftentimes each target 102 may also be a shooter 100. In such embodiments, each target 102 may also include a weapon 131 that may be similar to weapon 110. For example, the weapon 131 may include a haptic device 132 that provides tactile feedback when a trigger of the weapon 131 is actuated that simulates the feel of the weapon 131 firing a live round. The target 102 may also include an orientation module 134 that operates similar to orientation module 114. Each target 102 may also include an optical camera 136 that may be used to calibrate the orientation module 134 as will be discussed in greater detail below. Additionally, when operating as a shooter 100, the feedback devices 126 of each target 102 may perform similar functions as describe in relation to feedback devices 118 for the shooter 100.

Figure 2:
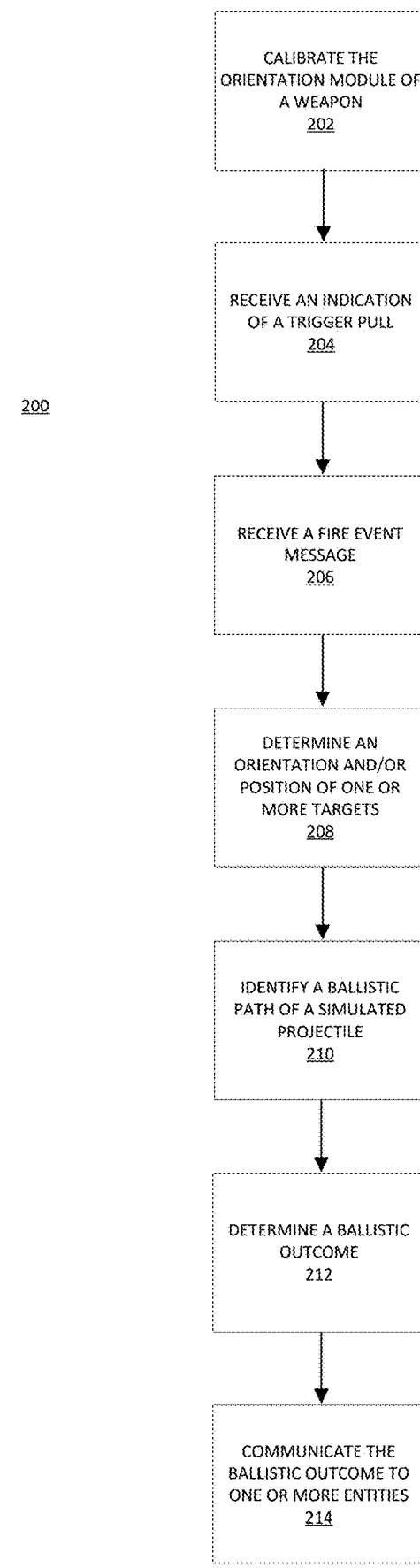
FIG. 2 is a flowchart of a process for operating the system of FIG. 1 according to embodiments.

FIG. 2 is a flowchart of a process 200 describing the functionality of the various components of the system described in relation to FIG. 1. Some or all of process 200 may be performed at the base station server 106, however as discussed below, one or more steps may be performed by a processor of the shooter 100 (such as on the weapon 110, orientation module 114, optical camera 116, and/or hub 124). Process 200 may optionally begin at block 202 by calibrating the orientation module 114. The calibration process may involve using known locations of various objects detected by the weapon 110 (such as by using the optical sensor 116) to correct or otherwise calibrate the position and orientation measurements of the orientation module 114. An example of a calibration process will be described in greater detail with respect to FIG. 3 below. The calibration may be performed by a unit carried by the shooter 100, such as the weapon 110, orientation module 114, optical camera 116, and/or hub 124, and/or by the base station server 106. For example, corrections made to measurements of the orientation module 114 may be used by the base station server 106 to correct orientation measurement received from the orientation module 114 and/or the corrections may be provided to the orientation module 114 (typically via the hub 124), which may make the calibration corrections prior to providing any measurements to the base station server 106.

Process 200 may continue when the shooter 102 pulls the trigger of the weapon 110. At this time, an indication of a trigger pull may be received at the base station server 106 at block 204. For example, the weapon 110 may communicate the indication to the base station 106 (possibly via the hub 124). The base station server 106 may also receive, from the weapon 110 (possibly via the hub 124) a fire event message at block 206. The fire event message may contain a data packet that includes a timestamp of the trigger pull, an orientation of the weapon device 110 (and optionally an estimated uncertainty of the orientation measurement), a position of the weapon 110 and/or shooter 100 (and optionally an estimated uncertainty of the position measurement, a velocity of the weapon 110 and/or shooter 100 (which may be 0 or not sent if neither the weapon 110 or shooter 100 is moving at the time of the trigger pull), a weapon ID, an ammunition type, and/or other information. The orientation of the weapon 110 may include azimuth, elevation, and/or canting angles of the weapon 110. In some embodiments, the indication of the trigger pull and the data packet may be received as part of a single message from the weapon 110.

In some embodiments, the base station server 106 may interpret the data and update virtual entities (positions of shooters, targets, etc.) on a virtual battlefield, which may be output on a display screen for visualization purposes. The base station server 106 may determine a position and/or an orientation of one or more targets 102 at block 208. In some embodiments, the position and/or orientations of the targets 102 may be updated continuously and/or periodically to track the movement of each entity on the battlefield, while in other embodiments the position and/or orientations of the targets 102 may be determined in response to the trigger pull. In some embodiments, the position and/or orientations of the targets 102 may be provided to the base station server 106 by the orientation module 134 and/or halo 127 (oftentimes via the hub 130). In other embodiments, the positions and/or orientations of one or more targets 102 may be determined based on image data provided by the optical camera 116 of the shooter 100. For example, based on calibrated position and orientation measurements of the weapon 110, the position of a target 102 within an image of the optical camera 116 may be determined, as long as the optical camera 116 field of view is aligned with the barrel of the weapon 110. In some embodiments, a heading and velocity of a target 102 may be determined by the base station server 106. For example, the orientation module 134 and/or halo 126 may provide measurements of the heading and velocity of a target 102 to the base station server 106 and/or continuous polling of the position and orientation of targets 102 by the base station server 106 may detect changes in the position and orientation of targets 102 that may be used by the base station server 106 to determine a heading and velocity of the target 102. In yet other embodiments, the optical camera 116 of the shooter 100 may detect movement of the target 102 over multiple image frames, which may be used by the equipment of the shooter 100 (such as the weapon 110, optical camera 116, orientation module 114, hub 124, etc.) and/or the base station server 106 to derive a heading and velocity of the target 102.

The base station server 106 may then identify a ballistic path of a simulated projectile fired from the weapon device by running a ballistic fly out calculation at block 210. The ballistic path may be based on some or all of the data included in the fire event message, such as the timestamp of the trigger pull, an orientation of the weapon device 110 (and optionally an estimated uncertainty of the orientation measurement), a position of the weapon 110 and/or shooter 100 (and optionally an estimated uncertainty of the position measurement, a velocity of the weapon 110 and/or shooter 100 (which may be 0 or not sent if neither the weapon 110 or shooter 100 is moving at the time of the trigger pull), a weapon ID, an ammunition type, and/or other information. Additional information, such as environmental conditions (wind, precipitation, temperature, barometric pressure, etc.) and/or gravitational effects on the simulated projectile based on a time-of-flight of the projectile, may also be used. In some embodiments, the ballistic path may be calculated by the base station server 106 based on an algorithm that take some or all of the factors above into account. In other embodiments, the base station server 106 may include and/or have access to a ballistic table that includes a ballistic path for any number of permutations of the above variables, including the orientation and position of the weapon 110. For example, the hit position may be expressed as:

$$x_{hit} = \Delta t \times [v_o \cos(\theta_{IMU,ST}) \sin(\Phi_{IMU,ST}) + V_{wind} v_o \cos(\Phi_{IMU,ST}) \sin(\Phi_{wind})(0.08\Delta t^2 + 0.009\Delta t - 0.008)] \quad \text{Eqn. 1}$$

$$y_{hit} = \Delta t \times [v_o \cos(\theta_{IMU,ST}) + 0.5G\Delta t] \quad \text{Eqn. 2}$$

$$z_{hit} = \Delta t \times [v_o \cos(\theta_{IMU,ST}) \cos(\Phi_{IMU,ST}) + V_{wind} v_o \sin(\Phi_{IMU,ST}) \sin(\Phi_{wind})(0.08\Delta t^2 + 0.009\Delta t - 0.008)], \quad \text{Eqn. 3}$$

wherein
 $V_{wind}$ is the measured velocity of wind in the relative environment as measured via an anemometer, and
 $\Phi_{wind}$ is the angle of the wind with respect to the virtual projectile direction of straight travel Any algorithm and/or lookup tables used by the base station server 106 may be tailored to the ballistic characteristics of the weapon 110 and/or ammunition being used in the simulation. This ensures that the system is weapon agnostic and may be modified for use with any type of weapon 110 and/or ammunition. In some embodiments, the ballistic path may be in the form of one or more curved vectors that represent arced paths of the projectile. In some embodiments, each point along the ballistic path may be associated with a time value. The time value may be indicative of where on the ballistic path the projectile will be at a given time relative to the timestamp of the trigger pull.

At block 212, a ballistic outcome is determined by identifying whether the ballistic path intersects with the position of the target. For example, the position of the target may be compared to various points in the ballistic path. If there are any intersections, the base station server 106 may detect a hit, and possibly where on the target the hit occurred. The base station server 106 may then evaluate whether the hit resulted in a kill, injury, and/or other outcome. If no intersections are present, the base station server 106 may determine that the shot resulted in a miss. The result of the ballistic outcome (hit, miss, injury, kill, etc.) may be communicated to one or more entities at block 214. For example, the result of the ballistic outcome may be sent to one or more feedback devices of the shooter 100 and/or target 102.

In some embodiments, the shooter 100, weapon 110, and/or target 102 may be moving at the time of the trigger pull. In such instances, the movement of the shooter 100, weapon 110, and/or target 102 may be factored into the ballistic path and/or ballistic outcome calculations. For example, the ballistic path algorithms and/or lookup tables may factor in any movement (heading and velocity) of the shooter 100 and/or weapon 110. Movement of the target 102 may be simulated by generating target vectors based on the position of the target 102 at the time of the trigger pull and the heading and velocity of movement. Each point along the target vectors may be associated with a time value that is indicative of where on the target path the target 102 will be at a given time relative to the timestamp of the trigger pull. To determine intersections, the base station server 106 may compare the ballistic paths at each time value with the target paths at similar time values to determine if the simulated projectile will hit or miss a given target 102.

Position and/or orientation sensors have an associated error rate, which may be quite low (such as 1° or less for IMUs and a number of cm for GPS sensors). However, at long distances even small error rates may result in missed shots. To handle such errors, the base station server 106 may factor in any uncertainty associated with the position and/or orientation of the weapon 110 and/or target 102 when performing the ballistic path and/or ballistic outcome calculations. For example, any estimated uncertainty associated with the orientation modules 114, 134, and/or halo 120 (or other position sensors) may be used to adjust an aimpoint of the weapon to snap or lock onto an expected target, as will be discussed in greater detail with respect to FIG. 4. This ensures that a shooter 100 is not punished for errors created by the uncertainty in measurements by the position and/or orientation sensors in his weapon 110 and/or on the target.

Figure 3:
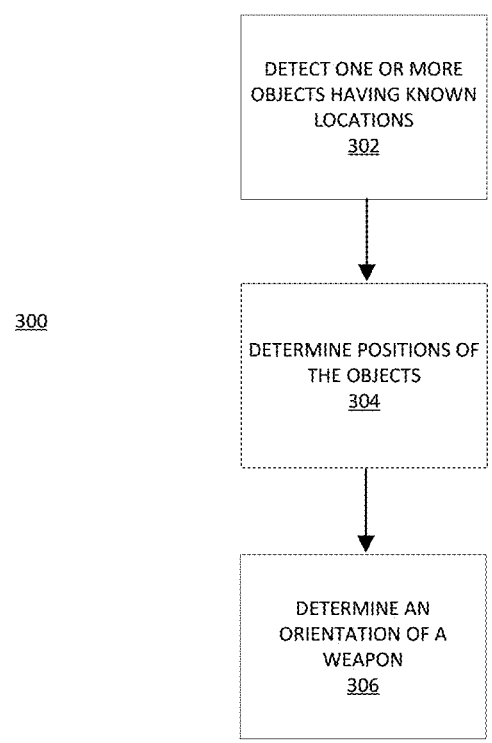
FIG. 3 is a flowchart of a process for calibrating the orientation and/or position of a weapon according to embodiments.

Turning now to FIG. 3, a flowchart of a process 300 for calibrating the orientation and/or position of a weapon 110 (such as the orientation module 110 affixed to the weapon 110) and/or other sensor of a shooter 100 or target 102 is illustrated. Process 300 may be performed by the equipment of shooter 100 (weapon 110, orientation module 114, optical camera 116, hub 124, etc.) and/or by the base station server 106. Process 300 may begin at block 302 by detecting one or more objects having known locations (sources of truth). The sources of truth may include any data sources from which accurate orientation and/or position information can be obtained. For example, fiducial beacons 104 may be used as sources of truth, as the fiducial beacons 104 have known, fixed locations. The fiducial beacons 104 may be detected in several ways. For example, each fiducial beacon 104 may emit an optical signal that is detectable by the optical camera 116. The optical signal may identify the fiducial beacon 104 and/or a location of the fiducial beacon 104. This information may be used by the equipment of the shooter 100 and/or the base station server 106 to determine a location of each fiducial beacon 104. Other objects may be used as sources of truth along with, or instead of fiducial beacons 104. For example, other markers/light sources with known locations and identifiers can also be used, such as light emitted from a mobile entity, such as the optical beacons 128 of the halo 127 of a target 102. In some embodiments, the use of targets 102 as sources of truth may be restricted to only those targets 102 that have a particularly reliable orientation and/or position. For example, some embodiments may utilize targets 102 (or beacons thereof) as sources of truth if one or more (or all) of the various position and/or orientation sensors used by the target 102 have been calibrated recently (such as within a predetermined time period).

At block 304, positions of the detected sources of truth may be determined. As described above, this may be done by reading location data within the signal emitted from the fiducial beacon 104 and/or optical beacon 128, or may be done by looking up known locations of the sources of truth based on identifiers within the signals emitted from the respective beacon 104, 128. At block 306, the orientation of the weapon 110 (or other device) may be determined. For example, a pixel location within an image of the optical camera 114 for each detected source of truth may be compared to known locations of the sources of truth based on the field of view of the optical camera 116. Based on this comparison, the weapon 110 (or other device) and/or base station server 106 may determine an offset between the measured position and/or orientation of the weapon 110 (or other device) and the actual position of the weapon 110 (or other device). As described above, corrections made to position and/or orientation measurements may be used by the base station server 106 to correct orientation measurement received from the weapon 110 (or other device), or the corrections may be provided to the orientation module 114 (typically via the hub 124), which may make the calibration corrections prior to providing any measurements to the base station server 106.

Once calibrated, the weapon 110 may remain highly accurate for many hours. In some embodiments, the calibration may improve the precision of the orientation module from within 2-5 mrad to up to <1 mrad. The frequency of calibration/recalibration using these additional sources of truth can vary (e.g., depending on the type of "additional sources of truth" and various other factors).

Figure 4:
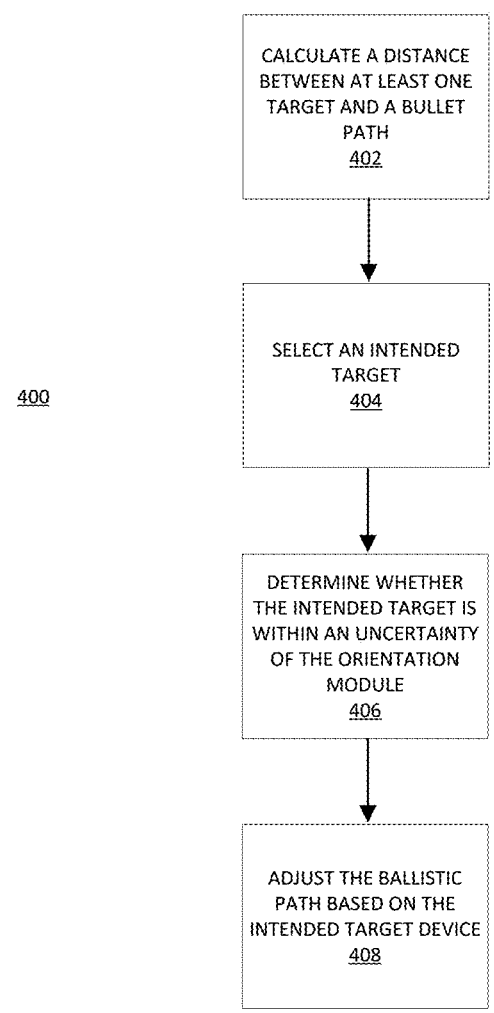
FIG. 4 is a flowchart of process for adjusting a ballistic path for position and/or orientation uncertainty according to embodiments.

Turning now to FIG. 4, a process 400 for adjusting a ballistic path for position and/or orientation uncertainty. Process 400 may be performed by the base station server 106 as part of or after a ballistic path determination as disclosed above. As such, the base station server 106 may have access to any data that is available prior to or at block 210 of process 200 described above. Process 400 may begin at block 402 by calculating the distance of one or more target players from a determined trajectory or ballistic path of the projectile. Based on the estimated position, orientation uncertainty, and distance to the target 102, the base station server 106 selects an intended target 102 at block 404. For example, the base station server 106 may determine a target 102 that is closest to the ballistic path. In embodiments where one or more of the targets 102 are moving, distances between potential intersections of the ballistic path and target paths (as described above) may be used to determine the intended target 102. At block 406, the base station server 106 may determine whether the intended target 102 is within the uncertainty of one or more of the position and/or orientation sensors (such as orientation module 114). If the uncertainty rate is within the uncertainty rate of the position and/or orientation sensors, the base station server 106 may adjust the ballistic path based on the intended target at block 408. In some embodiments, this may optionally involve running a Monte Carlo simulation and/or other algorithm to determine the likelihood of the adjusted ballistic path resulting in a hit or miss and/or a result of any hits (kill, injure, location of hit, etc.). Upon making any adjustments to the ballistic path, the ballistic outcome may be reported to one or more devices as described above.

It will be appreciated that many of the processes above may include steps described as being performed by the weapon 110 and/or orientation module 114, and that in some embodiments some or all of the processing steps may be performed by other processing devices worn by the shooter 100, such as those in the hub 124, halo 120, etc.

Figure 5:
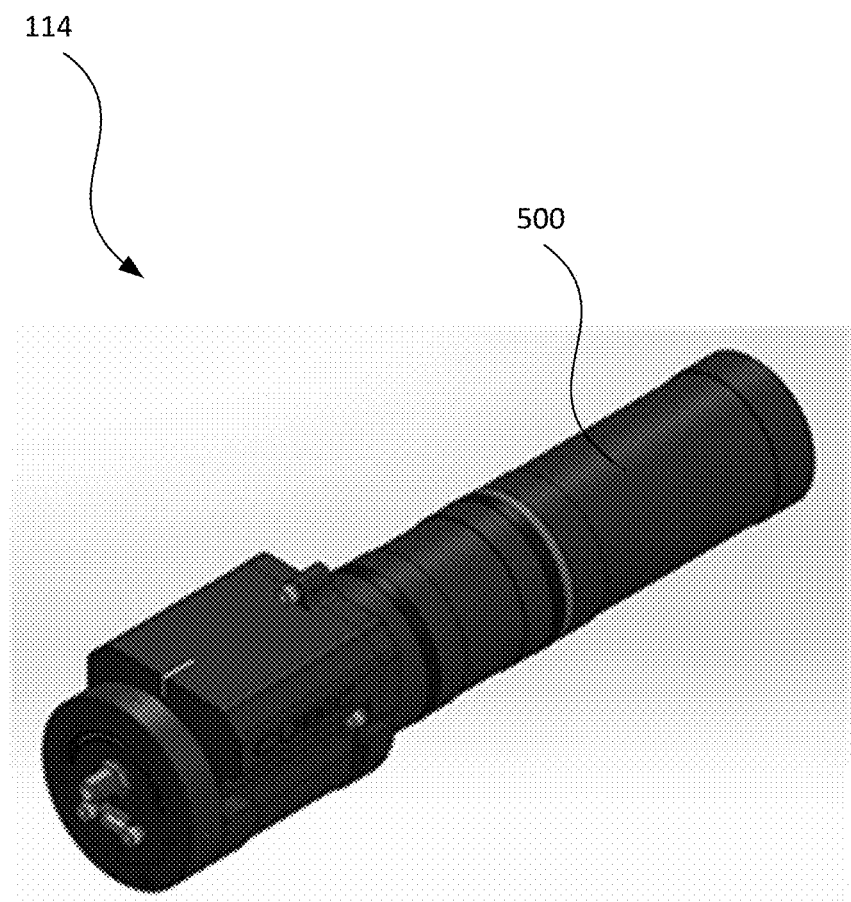
FIG. 5 illustrates an orientation module according to embodiments.

FIG. 5 illustrates one embodiment of an orientation module 114 according to the present invention. It will be appreciated that orientation module 114 is merely one example, and that numerous designs of orientation modules 114 may exist in various embodiments. For example, the orientation module 114 may be designed to be affixed to and operate with any type of weapon 110. As illustrated, orientation module 114 includes a body 500 that houses the internal components of the orientation module 114, such as an IMU, precision GPS, and hardware for Bluetooth Low Energy (BLE), IEEE 802.15.4 (Zigbee), and micro-USB interfaces. In some embodiments, the orientation module 114 may be designed to be affixed to an exterior of the weapon 110, such as on the stock or barrel of the weapon 110. In other embodiments, such as illustrated here, the body 6500 is configured to fit within a barrel of the weapon 110. For example, the body 500 may fit within the 40 mm barrel of the M203 and M320 grenade launchers (or within other sizes barrels of various weapons 110). In such embodiments, the body 500 may be adapted to create a "secure fit" within the barrel. As just one example, the body 500 may lock into the barrel by rotating a front assembly that enables the expansion of two rubber rings that hold the body 500 very firmly in place within the barrel.

Figure 6:
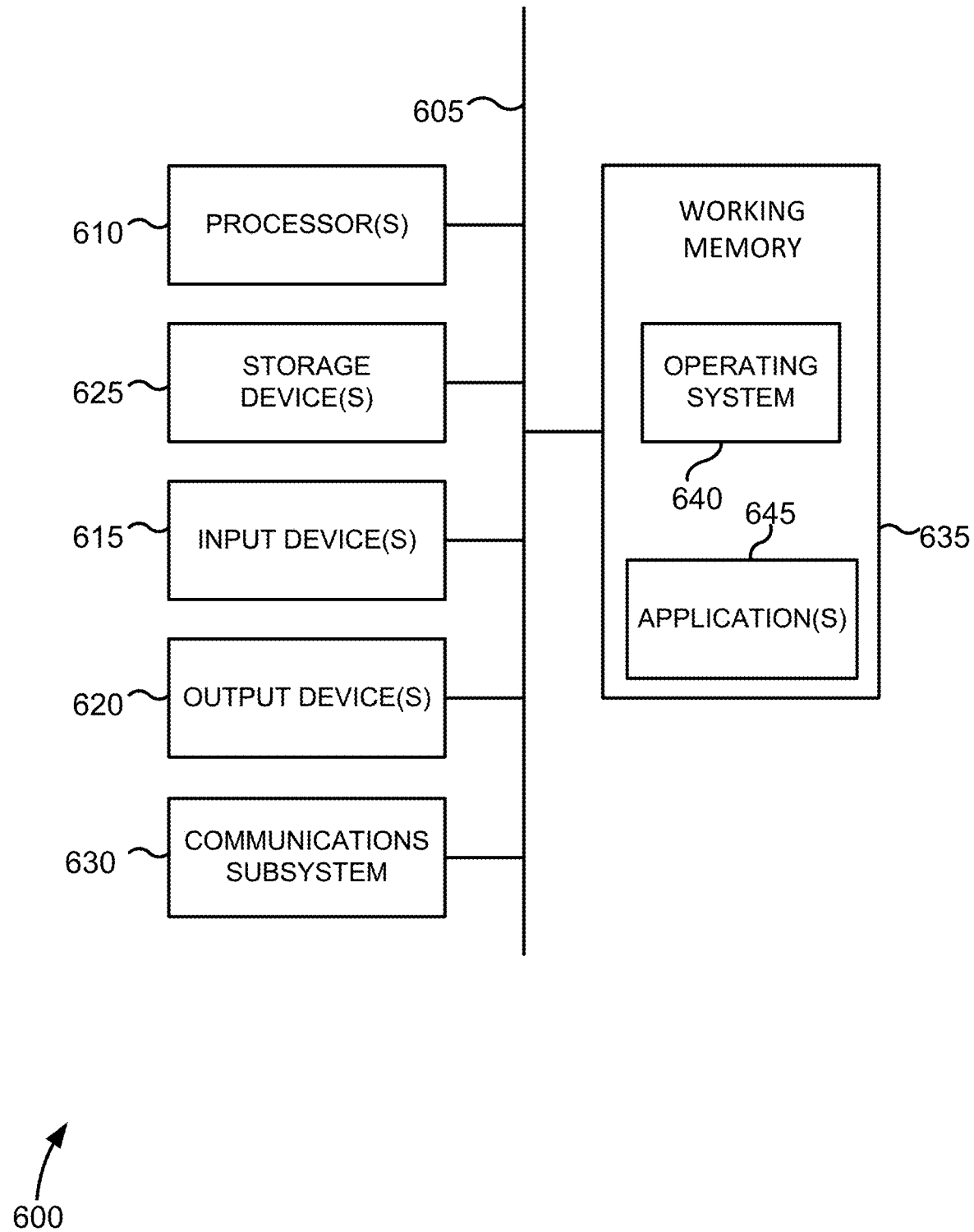
FIG. 6 is a block diagram of a computing system according to embodiments.

A computer system as illustrated in FIG. 6 may be incorporated as part of the previously described computerized devices. For example, computer system 600 can represent some of the components of computing devices, such as equipment of the shooter 100, target 102, fiducial beacons 104, base station server 106, and/or other computing devices described herein. FIG. 6 provides a schematic illustration of one embodiment of a computer system 600 that can perform the methods provided by various other embodiments, as described herein. FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include a processing unit 610, including without limitation one or more processors, such as one or more special-purpose processors (such as digital signal processing chips, graphics acceleration processors, and/or the like); one or more input devices 615, which can include without limitation a keyboard, a touchscreen, receiver, a motion sensor, a camera, a smartcard reader, a contactless media reader, and/or the like; and one or more output devices 620, which can include without limitation a display device and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communication interface 630, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 630 may permit data to be exchanged with a network (such as the network described below, to name one example), other computer systems, and/or any other devices described herein. In many embodiments, the computer system 600 will further comprise a non-transitory working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 610, applications 645, etc.) Further, connection to other computing devices such as network input/output devices may be employed.

Some embodiments may employ a computer system (such as the computer system 600) to perform methods in accordance with the disclosure. For example, some or all of the procedures of the described methods may be performed by the computer system 600 in response to processing unit 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processing unit 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processing unit 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire, and fiber optics, including the wires that comprise the bus 605, as well as the various components of the communication interface 630 (and/or the media by which the communication interface 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a non-transitory storage device 625 either before or after execution by the processing unit 610.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A base station server of a combat simulation system, comprising:
    a communications interface;
    at least one processor; and
    a memory having instructions stored thereon that, when executed by the at least one processor, cause the at least one processor to:
      receive an indication of a trigger pull from a weapon device;
      receive a data packet from the weapon device, the data packet comprising an orientation of the weapon device and a position of the weapon device;
      determine a position and an orientation of a target;
      identify a ballistic path of a simulated projectile fired from the weapon device, wherein the ballistic path is based at least in part on:
        the orientation and the position of the weapon device, the orientation of the weapon device comprising:
          a canting angle of the weapon device;
          an azimuth angle of the weapon device; and
          an elevation angle of the weapon device, and
        at least one of:
          an estimated uncertainty of the canting angle of the weapon device,
          an estimated uncertainty of the azimuth angle of the weapon device, and
          an estimated uncertainty of the elevation angle of the weapon device; and
      determine a ballistic outcome by identifying whether the ballistic path intersects with the position of the target.

2. The base station server of a combat simulation system of claim 1, wherein:
    the data packet further comprises an estimated uncertainty of one or both of the position of the weapon device and the orientation of the weapon device; and
    identifying the ballistic path is further based at least in part on the estimated uncertainty.

3. The base station server of a combat simulation system of claim 1, wherein:
    the indication of the trigger pull further comprises a timestamp of the trigger pull;
    the instructions further cause the at least one processor to determine a velocity and heading of one or both of the weapon device and the target; and
    determining the ballistic outcome is further based on the velocity and heading of one or both of the weapon device and the target.

4. The base station server of a combat simulation system of claim 3, wherein:
    determining the position and the orientation of the target comprises generating a number of positions indicative of a movement path of the target based on the velocity and heading of the target; and
    determining the ballistic outcome by identifying whether the ballistic path intersects with the position of the target further comprises comparing the ballistic path with at least one of the number of positions based on the timestamp of the trigger pull, a distance between the weapon device and the target, and a velocity map of the simulated projectile.

5. The base station server of a combat simulation system of claim 1, wherein:
    the ballistic path is further based on one or more of:
      ballistic properties associated with the weapon device and the simulated projectile;
      environmental conditions;
      a canting angle of the weapon device; and
      gravitational effects on the simulated projectile.

6. The base station server of a combat simulation system of claim 1, wherein:
    the instructions further cause the at least one processor to provide feedback related to the ballistic outcome to one or both of a user of the weapon device and the target.

7. The base station server of a combat simulation system of claim 1, wherein:
    the instructions further cause the at least one processor to calibrate one or both of the orientation and the position of the weapon device by comparing known locations of one or more objects relative to the orientation and the position of the weapon device.

8. A method of determining a ballistic outcome of a simulated round at a base station server, comprising:
    receiving an indication of a trigger pull from a weapon device;
    receiving a data packet from the weapon device, the data packet comprising an orientation of the weapon device and a position of the weapon device;
    determining a position and an orientation of a target;
    identifying a ballistic path of a simulated projectile fired from the weapon device, wherein the ballistic path is based at least in part on:

the orientation and the position of the weapon device, the orientation of the weapon device comprising:
a canting angle of the weapon device;
an azimuth angle of the weapon device; and
an elevation angle of the weapon device, and
at least one of:
an estimated uncertainty of the canting angle of the weapon device;
an estimated uncertainty of the azimuth angle of the weapon device; and
an estimated uncertainty of the elevation angle of the weapon device; and
determining a ballistic outcome by identifying whether the ballistic path intersects with the position of the target.

9. The method of determining a ballistic outcome of a simulated round at a base station server of claim 8, wherein:
the indication of the trigger pull and the data packet are received as part of a single message from the weapon device.

10. The method of determining a ballistic outcome of a simulated round at a base station server of claim 8, wherein:
the data packet further comprises an estimated uncertainty of one or both of the position of the weapon device and the orientation of the weapon device; and
identifying the ballistic path is further based at least in part on the estimated uncertainty.

11. The method of determining a ballistic outcome of a simulated round at a base station server of claim 8, wherein:
the indication of the trigger pull further comprises a timestamp of the trigger pull;
the method further comprises determining a velocity and heading of one or both of the weapon device and the target; and
determining the ballistic outcome is further based on the velocity and heading of one or both of the weapon device and the target.

12. The method of determining a ballistic outcome of a simulated round at a base station server of claim 11, wherein:
determining the position and the orientation of the target comprises generating a number of positions indicative of a movement path of the target based on the velocity and heading of the target; and
determining the ballistic outcome by identifying whether the ballistic path intersects with the position of the target further comprises comparing the ballistic path with at least one of the number of positions based on the timestamp of the trigger pull, a distance between the weapon device and the target, and a velocity map of the simulated projectile.

13. The method of determining a ballistic outcome of a simulated round at a base station server of claim 8, wherein:
the ballistic path is further based on one or more of:
ballistic properties associated with the weapon device and the simulated projectile; environmental conditions; a canting angle of the weapon device; and gravitational effects on the simulated projectile.

14. The method of determining a ballistic outcome of a simulated round at a base station server of claim 8, further comprising:
providing feedback related to the ballistic outcome to one or both of a user of the weapon device and the target.

15. A non-transitory computer-readable medium having instructions stored thereon that, when executed by at least one processor, cause the at least one processor to:

receive an indication of a trigger pull from a weapon device;
receive a data packet from the weapon device, the data packet comprising an orientation of the weapon device and a position of the weapon device;
determine a position and an orientation of a target;
identify a ballistic path of a simulated projectile fired from the weapon device, wherein the ballistic path is based at least in part on:
the orientation and the position of the weapon device, the orientation of the weapon device comprising:
a canting angle of the weapon device;
an azimuth angle of the weapon device; and
an elevation angle of the weapon device, and
at least one of:
an estimated uncertainty of the canting angle of the weapon device;
an estimated uncertainty of the azimuth angle of the weapon device; and
an estimated uncertainty of the elevation angle of the weapon device; and
determine a ballistic outcome by identifying whether the ballistic path intersects with the position of the target.

16. The non-transitory computer-readable medium of claim 15, wherein:
the data packet further comprises an estimated uncertainty of one or both of the position of the weapon device and the orientation of the weapon device; and
identifying the ballistic path is further based at least in part on the estimated uncertainty.

17. The non-transitory computer-readable medium of claim 15, wherein:
the indication of the trigger pull further comprises a timestamp of the trigger pull;
the instructions further cause the at least one processor to determine a velocity and heading of one or both of the weapon device and the target; and
determining the ballistic outcome is further based on the velocity and heading of one or both of the weapon device and the target.

18. The non-transitory computer-readable medium of claim 17, wherein:
determining the position and the orientation of the target comprises generating a number of positions indicative of a movement path of the target based on the velocity and heading of the target; and
determining the ballistic outcome by identifying whether the ballistic path intersects with the position of the target further comprises comparing the ballistic path with at least one of the number of positions based on the timestamp of the trigger pull, a distance between the weapon device and the target, and a velocity map of the simulated projectile.

19. The non-transitory computer-readable medium of claim 15, wherein:
the instructions further cause the at least one processor to provide feedback related to the ballistic outcome to one or both of a user of the weapon device and the target.

20. The non-transitory computer-readable medium of claim 15, wherein:
the instructions further cause the at least one processor to calibrate one or both of the orientation and the position of the weapon device by comparing known locations of one or more objects relative to the orientation and the position of the weapon device.

\* \* \* \* \*